US008867573B2

(12) United States Patent
Kolinummi et al.

(10) Patent No.: US 8,867,573 B2
(45) Date of Patent: Oct. 21, 2014

(54) TRANSFERRING DATA BETWEEN ASYNCHRONOUS CLOCK DOMAINS

(75) Inventors: Pasi Kolinummi, Kangasala (FI); Mika Koikkalainen, Tampere (FI); Juhani Vehvilainen, Helsinki (FI)

(73) Assignee: Nokia Corporation, Espoo (FI)

( * ) Notice: Subject to any disclaimer, the term of this patent is extended or adjusted under 35 U.S.C. 154(b) by 927 days.

(21) Appl. No.: 12/597,049

(22) PCT Filed: Apr. 23, 2007

(86) PCT No.: PCT/IB2007/051483
§ 371 (c)(1),
(2), (4) Date: Dec. 1, 2009

(87) PCT Pub. No.: WO2008/129364
PCT Pub. Date: Oct. 30, 2008

(65) Prior Publication Data
US 2010/0111117 A1    May 6, 2010

(51) Int. Cl.
*H04J 3/06*      (2006.01)
*H04L 7/00*      (2006.01)
*G06F 13/40*     (2006.01)

(52) U.S. Cl.
CPC .................................. *G06F 13/4059* (2013.01)
USPC ............ 370/503; 370/498; 375/354; 365/221; 365/239; 365/233.1; 713/400; 713/500; 713/503

(58) Field of Classification Search
CPC ......... H04J 3/06; H04J 3/0685; H04J 3/0664; H04L 7/00; H04L 7/0008; H04L 7/02; H04N 21/4305
USPC ........... 370/503, 498; 375/354; 365/221, 233, 365/239, 233.1–233.5; 713/400, 500, 503
See application file for complete search history.

(56) References Cited

U.S. PATENT DOCUMENTS

| | | | | |
|---|---|---|---|---|
| 5,608,755 | A | * | 3/1997 | Rakib ........................... 375/219 |
| 6,029,253 | A | * | 2/2000 | Houg ............................ 713/600 |
| 6,327,207 | B1 | * | 12/2001 | Sluiter et al. .................. 365/221 |
| 6,934,776 | B2 | * | 8/2005 | Connor et al. .................. 710/60 |
| 7,107,393 | B1 | | 9/2006 | Sabih |
| 7,461,284 | B2 | * | 12/2008 | Thompson et al. ........... 713/500 |
| 2001/0042219 | A1 | * | 11/2001 | Robertson ..................... 713/400 |
| 2005/0201163 | A1 | * | 9/2005 | Reichel et al. ........... 365/189.05 |
| 2006/0104318 | A1 | * | 5/2006 | Hernandez-Valencia et al. ............................ 370/538 |

OTHER PUBLICATIONS

International Search Report of PCT/IB2007/051483—Date of Completion of Search: Feb. 27, 2008.

* cited by examiner

*Primary Examiner* — Jamal Javaid
(74) *Attorney, Agent, or Firm* — Locke Lord LLP

(57) ABSTRACT

A device comprises an integrated circuit having first and second domains, the first domain having a first clock boundary module; and the second domain having a second clock boundary module. The first clock boundary module comprises: a buffer, for storing data for transfer to the second domain; and a first controller operable to send a first control signal to the second clock boundary module via a first synchronizer, the first control signal indicating the presence of a packet of data in a first storage location of the buffer. One of the first and second clock boundary modules comprises a multiplexer having an input connected to an output of the buffer and an output connected to circuitry forming part of the second domain. The second clock boundary module comprises: a second controller, operable in response to receiving the first control signal to control transfer of said data from the buffer by the multiplexer, and to send a second control signal to the first controller via a second synchronizer, the second control signal indicating transfer of said data.

18 Claims, 12 Drawing Sheets

TRANSFERRING DATA BETWEEN ASYNCHRONOUS CLOCK DOMAINS

FIELD OF THE INVENTION

The present invention relates to transferring data.

BACKGROUND

Many integrated circuits (ICs), such as application specific integrated circuits (ASICs), contain a number of modules. For example, an integrated circuit may include a memory, a central processing unit (CPU) and one or more peripheral modules.

In a simple IC, the operations are usually clocked by a single clock signal, and thus the modules run at the same frequency. Such a system is termed a synchronous system. In a synchronous system, clock bridges and buffers between modules are not usually required for transmitting data from one module to the other.

In more complicated synchronous systems, a very large clock tree is required to distribute the clock signal throughout the entire system. The clock tree distributes the clock signal(s) from a common point to all the elements that need it. As the size of the clock tree increases, it can become difficult to balance the clock tree to provide phase synchronicity between branches of the clock tree. In addition, a large clock tree consumes a lot of power.

In some ICs, different modules are clocked at different clock speeds. In these systems, each module is clocked by its own clock, so there is no need to route a global clock tree between modules. This allows each clock to be at the optimum speed for that module. These systems are termed a globally asynchronous locally synchronous (GALS) systems, and the usage of these systems is increasing. Each module or set of modules that utilise a common single clock belong to a single domain. The use of different clocks in different domains allows independent dynamic voltage scaling in those domains.

In addition, leakage current of sub-micron IC technology has increased. Thus, it is desirable to implement physical separation between modules to allow independent voltage and frequency scaling. As the number of transistors is ICs is increasing, the number of domains is also increasing. As a result of this, efficient data transfer across the domain boundaries is becoming increasingly important. The ability to provide fully asynchronous and independent domains on an IC is also becoming increasingly important.

Communication between the domains is typically performed on dedicated channels. Thus each domain is provided with a channel for each of the other domains with which it communicates. The component that handles communication across each domain boundary can be termed a clock boundary.

One commonly employed technique for transferring data over a domain boundary, where the domains are clock domains, is signal synchronizing. A synchroniser is used with some or all data signals on the communication channel, to ensure that the signal is aligned or phase-shifted to the clock on the destination domain. Metastability is an important issue in asynchronous circuits, and the synchroniser can minimises the probability of a metastable state being entered into.

One way of using synchronisers to transfer data is termed the hand-shaking protocol. In one example, when new information is available for transmission, a control signal is transmitted to a destination domain via a synchroniser indicating that there is new information. The destination domain reads this information, and sends a control signal back via a synchroniser, indicating that this information has been read. This indicates to the transmission side that new data can be prepared for transmission. Synchronising both signals means that metastability problems can be avoided, however transmission of data can be slow.

Since a dedicated channel is provided between components, a response must be waited for before a new request can be transmitted. Thus, the operation latency can also delay the signals. Typically, for efficient operation burst operation is used for transmission of data. In burst mode, the transmitter transmits data repeatedly without waiting for a response or waiting for an internal process to terminate before continuing the transfer of data.

Other components that have been used in addition to synchronisers to control data transfer in an integrated circuit are buffers such as First In-First Out (FIFO) components. FIFOs have been used to hold data temporarily while waiting for a suitable control signal.

The present invention seeks to provide improvements in transferring data over a border separating domains which may have different clock frequencies and/or clock phases.

SUMMARY OF THE INVENTION

A first aspect of the present invention provides a device, the device comprising an integrated circuit having first and second domains, the first domain having a first clock boundary module; and the second domain having a second clock boundary module, wherein the first clock boundary module comprises: a buffer, for storing data for transfer to the second domain; and a first controller operable to send a first control signal to the second clock boundary module via a first synchroniser, the first control signal indicating the presence of a packet of data in a first storage location of the buffer, wherein one of the first and second clock boundary modules comprises a multiplexer having inputs connected to outputs of the buffer and an output connected to circuitry forming part of the second domain; and
wherein the second clock boundary module comprises: a second controller, operable in response to receiving the first control signal to control said multiplexer to transfer said data from the buffer, and to send a second control signal to the first controller via a second synchroniser, the second control signal indicating transfer of said data.

The first clock boundary and the second clock boundary may together be termed a clock bridge. It will be understood that the first storage location of the buffer may not necessarily be the absolute first element. For example, the buffer may be a FIFO and thus have circularly addressable elements, in which case there may be no absolute first storage location. Similar considerations apply to the second storage location.

Use of the first and second control signal can allow communication between different clock or voltage/power domains. Thus, the clock signals in the different domains on the integrated circuit can be controlled and optimised separately. Use of a buffer having multiple outputs and a multiplexer can allow plural packets of data to be transferred efficiently.

The buffer may have a default storage location, said default storage location being the value of the first control signal when the first domain is reset, and the first controller may be operable, after transfer of said data from said first controller, to control transfer of further packets of data, said further packets of data containing null information, wherein the number of said further packets of data is sufficient to drive the first control signal and the second control signal to identify the default storage location of the buffer. In this way, if either of the first domain or the second domain is reset independently, the first control signal and second control signal can correspond to the correct storage location. This can allow the first domain and the second domain to be fully asynchronous.

The first controller may be further operable, in response to receiving the second control signal, to control transfer of further data to the first storage location of the buffer. In addition, the controller may be further operable, after sending said first control signal and before receiving said second control signal, to control transfer of additional data to other storage locations of the buffer. This can allow data transmission paths to be fully pipelined.

The second controller may further operable in response to receiving the first control signal to determine the amount of data in the buffer, and to control transfer of said packet of data only when the amount exceeds a threshold. This can allow optimised transfer of data when a clock running the first domain is slower than a clock running the second domain.

The second domain may further comprise: a second buffer, for storing data for transfer to the first domain; and a third controller operable to send a third control signal to the first clock boundary module via a third synchroniser, the third control signal indicating the presence of a packet of data in a first storage location of the second buffer; the device may comprise a second multiplexer having inputs connected to outputs of the second buffer and an output connected to circuitry forming part of the first domain; and the first domain may further comprise: a fourth controller, a second controller, operable in response to receiving the third control signal to control said second multiplexer to transfer said data from an output of second buffer, and to send a fourth control signal to the first controller via a fourth synchroniser, the fourth control signal indicating transfer of said data. Thus, transfer of data from the first domain to the second domain can be separate from transfer of data from the second domain to the first domain. This can allow the delay to transfer data can be made independent of the operation latency of the first and second domains. This can substantially increase the efficiency of data transfer if either of the first or second domains is capable of providing multiple outstanding operations. In addition, the minimum buffer size can be independent of the operation or other components in the system, and depends only on the time between sending the first control signal and receiving the second control signal. Furthermore, this can provide a device where all types of data can be transferred efficiently, thus information may not have to be transferred in burst mode. It will be appreciated that the first controller and the fourth controller may comprise a single controller, and the second controller and the third controller may also comprise a single controller.

A second aspect of the present invention provides a portable device incorporating a device of the invention.

A third aspect of the present invention provides a method comprising: writing data to a buffer provided on a first clock boundary on a first domain of an integrated circuit; sending, via a first synchroniser, a first control signal to a second clock boundary on a second domain of the integrated circuit, the first control signal indicating the presence of data in a first storage location of the buffer; in response to receiving the first control signal at the controller of the second domain: controlling a multiplexer to transfer said data from an output of the buffer to circuitry forming part of the second domain; and sending a second control signal to the first clock boundary via a second synchroniser, the second control signal indicating transfer of said data.

The method may be used below an industry defined communication interface such as AXI or OCP.

A fourth aspect of the invention provides apparatus comprising: means for writing data to a buffer, the buffer being provided on a first clock boundary on a first domain of an integrated circuit; means for sending, via a first synchroniser, a first control signal to a second clock boundary on a second domain, the first control signal indicating the presence of a packet of data in a first storage location of the buffer; means for transferring, in response to receiving the first control signal, said data from the buffer to circuitry forming part of the second domain; and means for sending, in response to after receiving the first control signal a second control signal to the first clock boundary via a second synchroniser, the second control signal indicating transfer of said data.

A fifth aspect of the present invention comprises a device, the device comprising an integrated circuit having first and second domains, the first domain having a first clock boundary module and being clocked by a first clock; and the second domain having a second clock boundary module and being clocked by a second clock, wherein the first clock boundary module comprises: a buffer having a plurality of storage locations, each for storing data for transfer to the second domain; and a first controller operable to send a first control signal to the second clock boundary module via a first synchroniser, the first control signal indicating the presence of a word of data in a first storage location of the buffer, wherein one of the first and second clock boundary modules comprises a multiplexer having inputs connected directly to outputs of the buffer and an output connected to circuitry forming part of the second domain; and wherein the second clock boundary module comprises: a second controller, operable in response to receiving the first control signal to: control the multiplexer to read said word of data from the buffer and to transfer said word of data to the second domain; and to send a second control signal to the first controller via a second synchroniser, the second control signal indicating transfer of said data.

A sixth aspect of the present invention provide a device comprising: an integrated circuit having first and second domains, a first clock bridge having a first clock boundary module on the first domain and a second clock boundary module on the second domain; and a second clock bridge, the second clock bridge having a third clock boundary module on the second domain and a fourth clock boundary module on the first domain, wherein the first clock bridge and the second clock bridge are operable to be controlled independently of each other, wherein the first clock boundary module comprises: a first transmitter module, for transferring data to the second domain; and a first controller operable to send a first control signal to the second clock boundary module via a first synchroniser, the first control signal indicating the presence of data in the transmitter module, wherein the second clock boundary module comprises: a first receiver module, for receiving data from the first domain; and a second controller, operable in response to receiving the first control signal to control said transfer of data from the first transmitter module, and to send a second control signal to the first controller via a second synchroniser, the second control signal indicating transfer of said data, wherein the third clock boundary module comprises: a second transmitter module, for transferring data to the first domain; and a third controller operable to send a third control signal to the fourth clock boundary module via a third synchroniser, the third control signal indicating the presence of data in the second transmitter module, and wherein the fourth clock boundary module comprises: a second receiver module, for receiving data from the second domain; and a fourth controller, operable in response to receiving the third control signal to control said transfer of data from the second domain, and to send a fourth control signal to the third controller via a fourth synchroniser, the fourth control signal indicating transfer of said data.

This can allow the forward and backward paths of data to be completely independent from each other. Thus, the delay to transfer data can be made independent of the operation latency of the first and second domains. This can substantially increase the efficiency of data transfer if either of the first or second domains is capable of providing multiple outstanding operations. In addition, this can provide a device where all types of data can be transferred efficiently, thus information may not have to be transferred in burst mode.

BRIEF DESCRIPTION OF THE DRAWINGS

Embodiments of the present invention will now be described by way of example only, with reference to the accompanying drawings in which.

DETAILED DESCRIPTION OF EMBODIMENTS OF THE INVENTION

Figure 1:
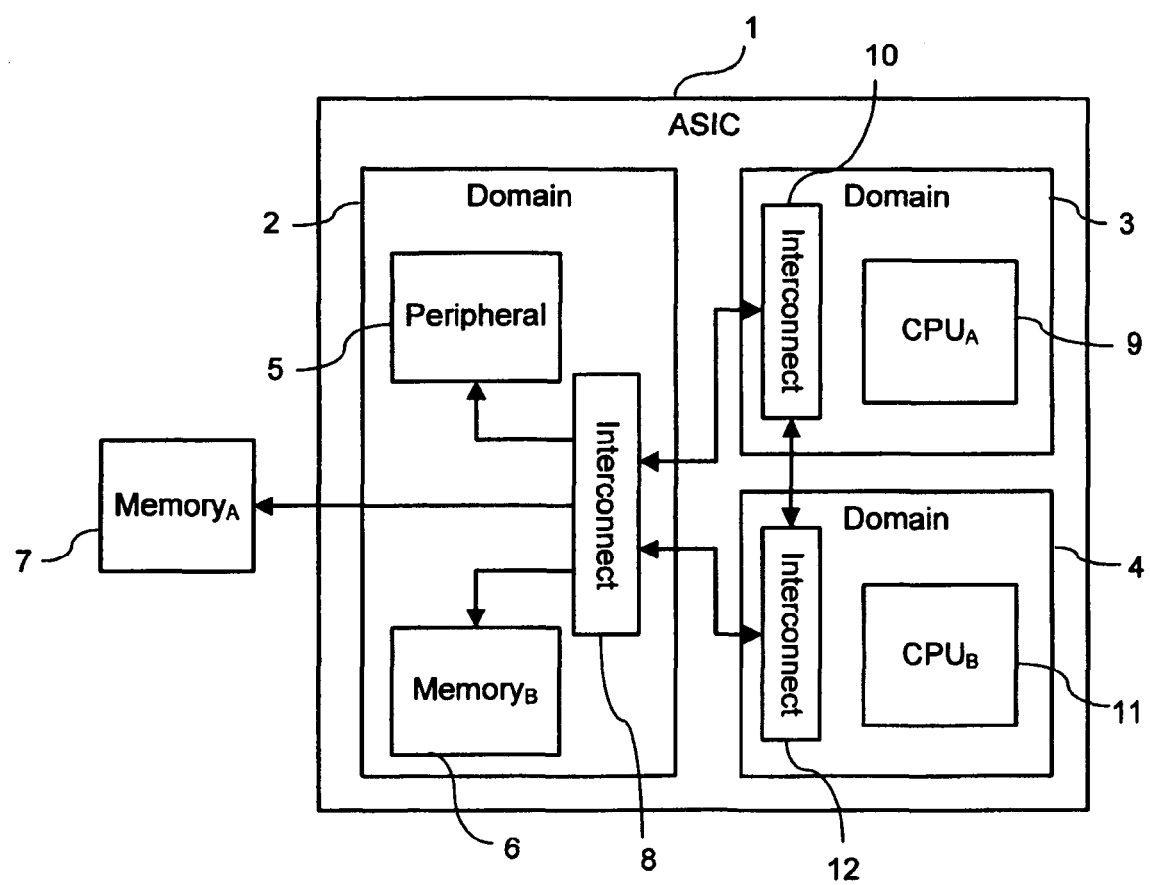
FIG. 1 is a schematic diagram of an ASIC comprising clock boundaries according to the present invention.

Referring firstly to FIG. 1, an ASIC 1 comprises a first domain 2, a second domain 3, and a third domain 4.

The first domain 2 comprises a peripheral module 5, a first memory (memory$_A$) 6, connected to a second, external, memory (memory$_B$) 7 and a first interconnect 8. The first domain is clocked by a first clock N (not shown).

The second domain 3 comprises a first CPU (CPU$_A$) 9 and a second interconnect 10. The second domain 3 is clocked by a second clock M (not shown). The second clock M (not shown) has a frequency that different from the frequency of the first clock N.

The third domain 4 comprises a second CPU (CPU$_B$) 11 and a third interconnect 12. The third domain 4 is clocked by a third clock L (not shown). The third clock L has a frequency that different from the frequency of the first clock N and the second clock M.

The first interconnect 8 connects the peripheral module 5, the memory 6 and the second memory 7 to the second and third interconnects 10, 12. The second interconnect 10 connects the first CPU 9 to the first and third interconnects 8, 12. The third interconnect 12 connects the second CPU 11 to the first and second interconnects 8, 10.

The first, second and third interconnects 8, 10, 12 are operable to control transfer of all data between the first, second and third domains 2, 3, 4.

Figure 2:
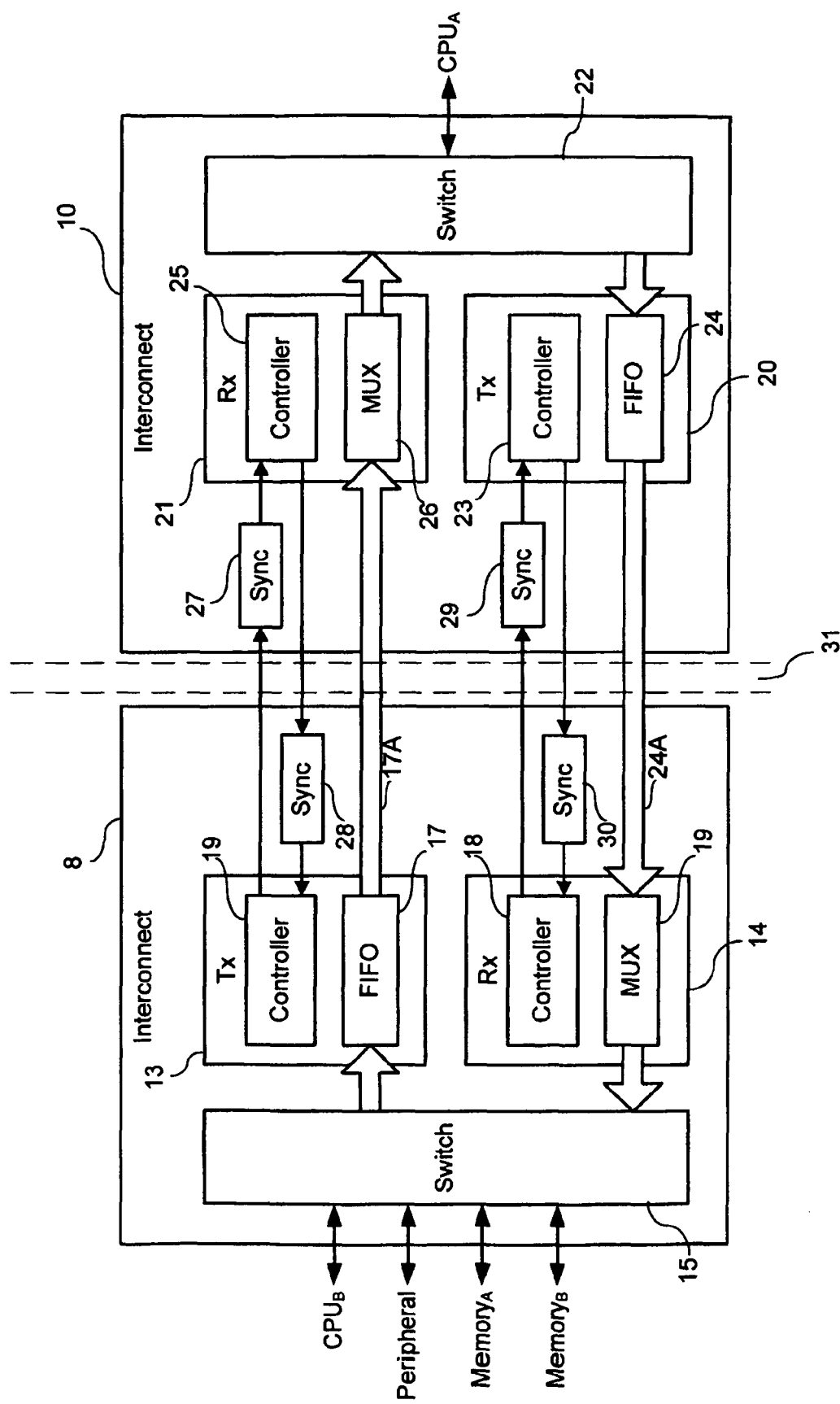
FIG. 2 is a schematic diagram of a first embodiment of two clock boundaries according to the present invention.

Referring now to FIG. 2, in a first embodiment the first interconnect 8 comprises a first transmitter module (Tx) 13, a first receiver module (Rx) 14 and a first switch 15. The first transmitter module 13 and the first receiver module 14 together constitute a first clock boundary. The first transmitter module 13 comprises a first controller 16 and a first First In-First Out (FIFO) 17. The first receiver module 14 comprises a first controller 18 and a first multiplexer (MUX) 19.

The first switch 15 has a multiple input/outputs for receiving data from and transmitting data to the peripheral device 5, first memory 6 and second memory 7 (FIG. 1). The first switch 15 has an output connected to an input of the first FIFO 17, and an input connected to the output of the first MUX 19.

The second interconnect 10 has a similar structure to the first interconnect 8. That is, the second clock boundary 10 comprises a second clock boundary having second transmitter module (Tx) 20 and a second receiver module (Rx) 21, and a second switch 22. The second transmitter module 20 comprises a second controller 23 and a second First In-First Out (FIFO) 24. The second receiver module 21 comprises a second controller 25 and a second multiplexer (MUX) 26.

The second switch 22 has an input/output for receiving data from and transmitting data to the first CPU 9 (FIG. 1). The second switch 22 has an output connected to an input of the second FIFO 24, and an input connected to the output of the second MUX 26.

The first Tx controller 16 has an output connected to an input of a first synchroniser 27 on the second clock boundary. The first synchroniser 27 has an output connected to an input of the second Rx controller 25.

The second Rx controller 25 has an output connected to an input of a second synchroniser 28 on the first clock boundary. The second synchroniser 28 has an output connected to an input of the first Tx controller 16.

The first Rx controller 18 has an output connected to an input of a third synchroniser 29 on the second clock boundary. The third synchroniser 29 has an output connected to an input of the second Tx controller 23.

The second Tx controller 23 has an output connected to an input of a fourth synchroniser 30 on the second clock boundary. The fourth synchroniser 30 has an output connected to an input of the first Rx controller 18.

The first, second, third and fourth synchronisers 27, 28, 29, 30 may be flip-flop based binary synchronisers. In this example, the first, second, third and fourth synchronisers 27, 28, 29, 30 each comprise two cascaded d-type flip-flops. This causes a delay that is twice the period of clock M for signals transmitted via the first and third synchronisers 27, 29 and a delay that is twice the period of clock N for signals transmitted via the second and fourth synchronisers 28, 30. The synchronisers may implement a different delay, for instance, one or one and a half clock cycles.

The first Tx controller 16 and the second Rx controller 25 are operable to send and receive control signals via their respective synchronisers 27, 28 over the domain boundary 31. The second Tx controller 23 and the first Rx controller 18 are also operable to send and receive control signals via their respective synchronisers 29, 30 over the domain boundary 31. The synchronisers act to align or phase-shift an input signal to the clock of the domain on which it resides. The synchronisers also act to minimise the probability of a metastable state being entered into.

The first FIFO 17 has an output connected to an input of the second MUX 26 by a connection 17A. The width of the connection 17A is equal to the size of the first FIFO 17. The first FIFO 17 is operable to provide data at its output for propagation over the domain boundary 31 to the second MUX 26. The second MUX 26 has an output connect to an input of the second switch 22 for transferring data from selected lines of the connection 17A to the second switch 22.

The first FIFO 17 is connected directly to the second MUX 26 i.e. there is no synchronisation circuitry interposed between these components, The second FIFO 24 has an output connected to an input of the first MUX 19. The first FIFO 24 is operable to provide data at its output for propagation over the domain boundary 31 to the first MUX 19. The width of a connection 24A between the second FIFO 24 and the first MUX 19 is equal to the number of bits in the FIFO 24. The first MUX 19 has an output connected to an input of the first switch 15 for transferring data from selected lines of the connection 24A to the first switch 15.

The first FIFO 17 has a plurality of storage locations for storing packets of data received from the first switch 15. Each of the storage locations can store a word or packet comprising plural bits. Each of the storage locations has an associated pointer value. The controller 19 is operable to control writing of data to the first FIFO 17 at allocation identified by a FIFO write pointer. The second MUX 26 is operable to control reading of data from a storage location at the first FIFO 17 identified by a FIFO read pointer. The operation of the first FIFO 17 is conventional. That is, data is written to sequential ones of the storage locations. Data is read from the first FIFO 17 in the same order that it has been written to the first FIFO 17.

The size of the storage elements in the first FIFO 17 and the depth of the FIFO 17 (i.e. the number of storage locations) can be configurable depending by implementation. In one example, the depth of the FIFO 17 is six, and the size of each storage location is 150 bits. Each storage location can store one packet, where a packet typically comprises 64 bits of data, 32 bits of address information and up to 54 hits of control information.

The first FIFO 17 is an asynchronous FIFO and as such has an unclocked output. The clock N of the first domain is used for writing data to the first FIFO 17.

The operation of the second MUX 26 is also conventional. That is, the second MUX 26 is operable to switch between outputs of sequential storage locations of the first FIFO 17 to provide a single data stream to the second switch 22.

The second FIFO 24 and the first MUX 19 have substantially the same structure and relationship with one another as the first FIFO 17 and the second MUX 26 respectively. In this case, writing data to the second FIFO 24 is clocked by the clock M of the second domain.

As described above, the first clock boundary and the second clock boundary are symmetrical. The first clock boundary and the second clock boundary together constitute a clock bridge.

The transfer of data from the first Tx module 13 to second Rx module 21 is independent of the transfer of data from the second Tx module 20 to the first Rx module 14.

The third interconnect 12 (not shown in FIG. 2) has substantially the same structure as the first and second interconnects 8, 10 and has a similar relationship with the first and second interconnects 8, 10. Thus, the third interconnect 12 also includes a third clock boundary that is also operable to transmit and receive control signals via synchronisers, and is also operable to transmit and receive data signals via FIFOs and MUXs. The second and third clock boundaries together form a second clock bridge, and the first and third clock boundaries together form a third clock bridge.

Figure 3A:
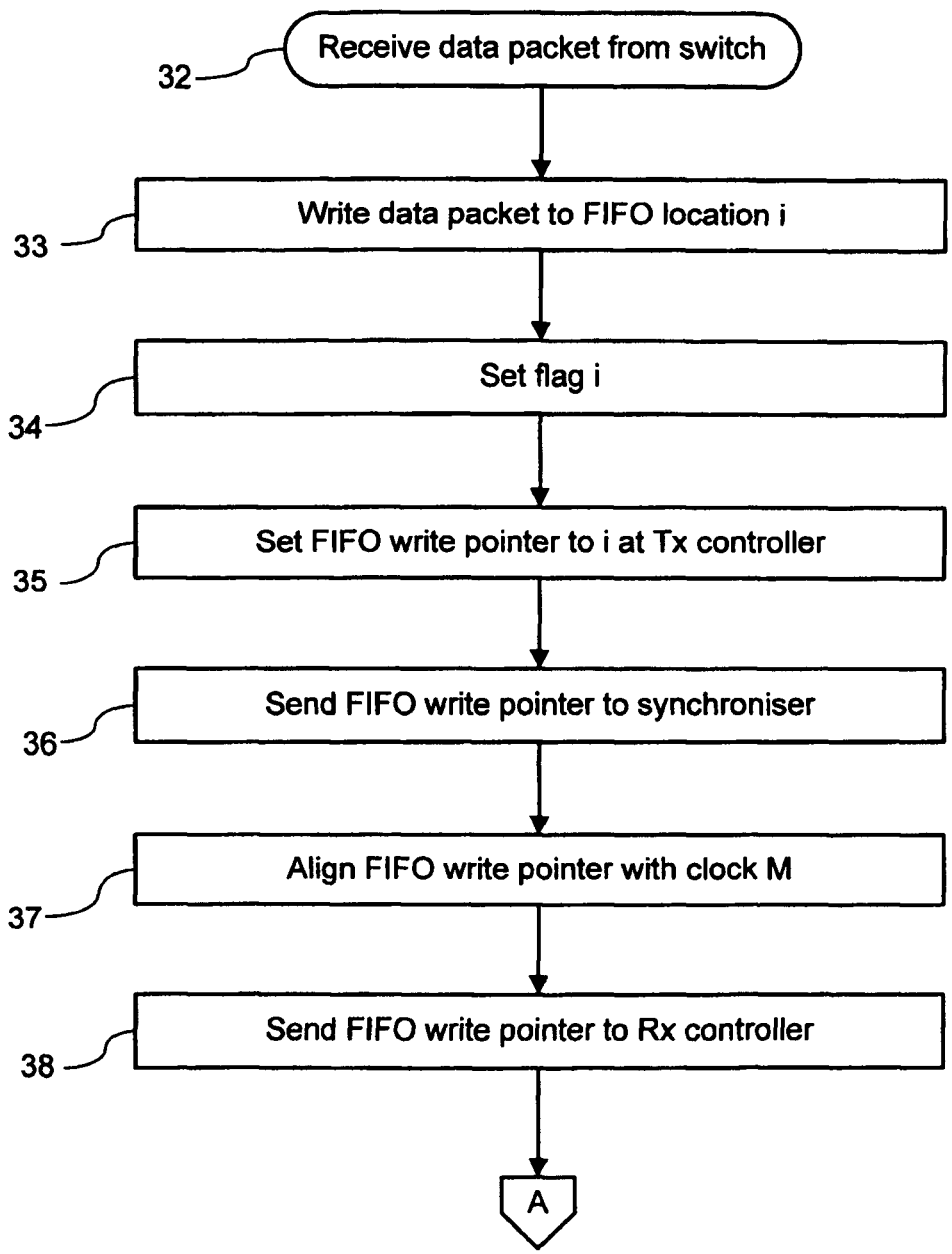
FIGS. 3A and 3B are flow diagrams of a method of transferring a data packet according to the present invention.
Figure 3B:
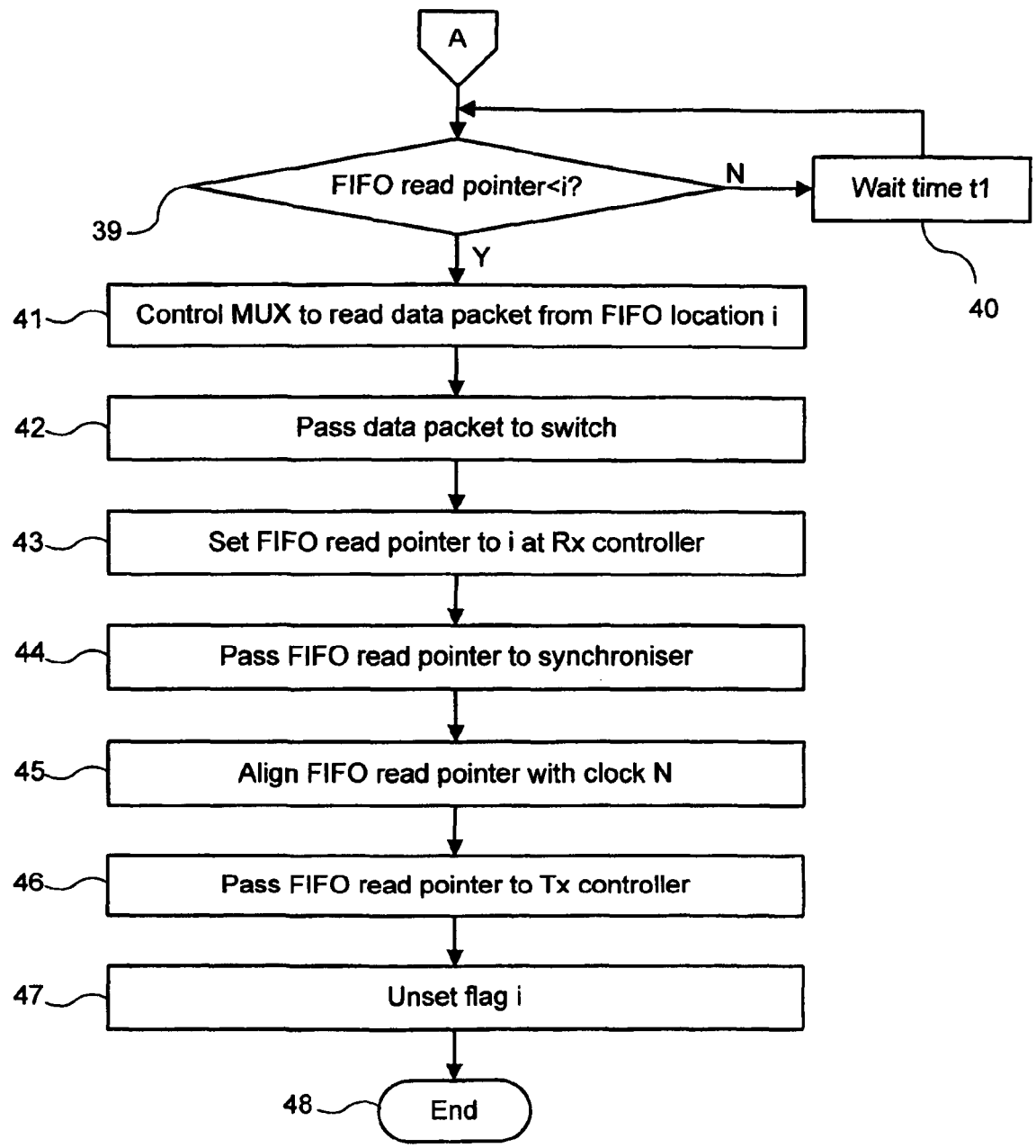
Figure 4:
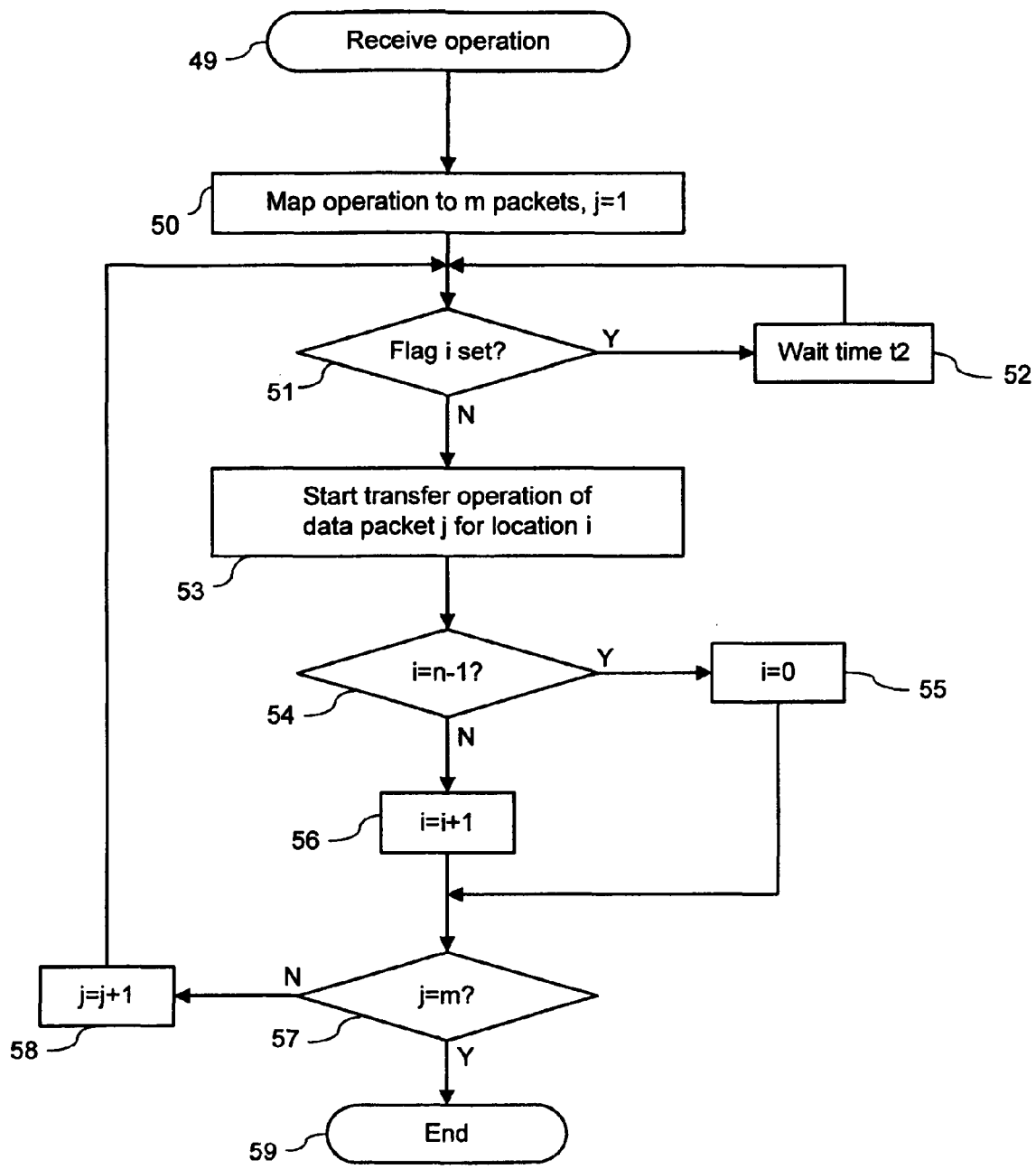
FIG. 4 is a flow diagram of a method of transferring a data signal according to the present invention.

Referring now to FIGS. 3A, 3B and 4, an operation for transmitting data will be described with respect to transferring data from the first interconnect 8 to the second interconnect 10. The operation will first be described with respect to transferring a single data packet, and then for controlling transfer of multiple packets. It will be appreciated that a corresponding operation can be used for transferring data from the second interconnect 10 to the first interconnect 8, or between the third interconnect 12 and either of the first or second interconnects 8, 10.

Referring firstly to FIG. 3A, the operation to transfer a single data packet begins at step 32 when the data packet is received from the first switch 15.

At step 33, the packet of data is written to location i of the first FIFO 17, synchronously with the clock N running on the first domain 2, under control of the first Tx controller 19. At step 34, the first Tx controller 19 sets a flag i. The set flag i is an internal indicator in the first Tx controller 19 indicating that there is data in storage location i of the first FIFO 17 that has not yet been transferred to the second domain 3. The flag i is set on the basis of the FIFO write pointer set by the first Tx controller 19 and the FIFO read pointer received by the second Rx controller 25. Thus, if the FIFO write pointer is equal to the FIFO read pointer, it indicates that all the data currently in the first FIFO 17 has been read by the second Rx controller 25, and all the flags are unset. If the flag i is at a location following the write pointer but before the read pointer, then that flag is set.

At step 35, the first Tx controller 19 sets the FIFO write pointer to i to indicate that data has been written to the corresponding storage location. At step 36, the first Tx controller 19 passes the FIFO write pointer as a control signal over the domain boundary 31 to the first synchroniser 27 on the second clock boundary. To advantage, the write pointers are encoded using Gray code. This provides improved reliability of pointer generation. The use of Gray code gives rise to the change in only one bit of the pointer value when the write pointer value is incremented. Alternatively, the write pointers could be encoded using another unit distance code, such as thermo code.

At step 37, the first synchroniser 27 aligns the write pointer with clock M of the second domain 3. The operation then proceeds to step 38, at which the first synchroniser passes the FIFO write pointer to the second Rx controller 25.

Referring now to FIG. 3B, at step 39, the second Rx controller 25 determines whether the FIFO read pointer is trailing the received FIFO write pointer i. It will be understood that since the FIFO is circularly addressable, this determination comprises more than simply determining whether the absolute value of the FIFO read pointer is less than i. For example, if the FIFO read pointer is 8, and i is 1, a positive determination will be made. If there is no difference between the FIFO read pointer and the FIFO write pointer the operation proceeds to step 40 where the second Rx controller 25 waits a time delay t1 before performing the determination again. In this example, the time delay t1 is one clock cycle of the clock M on the second domain 3.

If the FIFO read pointer is trailing the FIFO write pointer the operation proceeds to step 41. At step 41, the second Rx controller 25 controls the second MUX 26 to read data from location i of the first FIFO 17. The data is read synchronously with clock M running on the second domain 3. At step 42, the second MUX 26 passes the data packet to the second switch 22. The second switch 22 then controls transfer of the packet to the desired component on the second domain. At step 43, the FIFO read pointer is updated to value i by the second Rx controller 25 to indicate that the data has been read from storage location i.

At step 44, the FIFO read pointer is sent as a control signal over the domain boundary 31 to the second synchroniser 28. Preferably, the read pointers are encoded with Gray code or another unit distance code, such as thermo code.

At step 45, the second synchroniser 44 aligns the FIFO read pointer with the clock N running on the first domain 2. At step 46, the second synchroniser 28 passes the control signal containing the FIFO read pointer to the first Tx controller 16.

At step 47, the first Tx controller 19 determines that the data in storage location i of the first FIFO 17 has been read, and unsets flag i. This releases the storage location for use with a new packet of data.

The above-described operation describes transmitting a single packet of data. While the packet of data is being communicated, other packets of data are handled by the clock boundaries. In particular, after a first packet of data is written to storage location i, a second packet of data is written to storage location i+1. After this, a third packet of data is written to storage location i+2 and so on.

Referring now to FIG. 4, an operation for transferring data starts at step 49 when a data signal is received at the first switch 15. This data signal represents an operation for the first CPU 9 of the second domain 3. For instance, the operation may be a response to a memory read request. The data signal may be received from the peripheral module 5, the first memory 6 or the external memory 7, for example. The operation is mapped to discrete packets for transferring over the domain boundary 31.

At step 50, the operation is mapped to at least one packet. A packet counter j is set to 1. Each packet (except perhaps the last packet) comprises 64 bits of data.

At step 51, the first Tx controller 19 determines whether the flag i is set. If this is the first data signal received after start up of the ASIC 1, i is given the default value of 0. If the flag is set, indicating that there is data in storage location i of the FIFO 17 that has not yet been transferred to the second domain 3, the operation proceeds to step 52. At step 52, the first Tx controller waits a predetermined time delay t4 while data is read from the storage location i in accordance with the above-described operation. The operation then returns to step 51.

If instead at step 51 the first Tx controller determines that the flag i is not set, the operation proceeds to step 53. At step 53, the operation described with reference to FIGS. 3A and 3B is started for data location i, and data packet j. In this case, j is 1 as it is the first data packet of the signal.

While the transfer of the data packet is being carried out, the operation proceeds to step 54. At step 54, it is determined whether i is equal to n−1, where n is the size of the first FIFO 17. If i is equal to n−1, the operation proceeds to step 55 where i is set to 0. This implements a wrap-around in the FIFO 17. If i is not equal to n−1, the operation proceeds to step 56 where i is incremented by 1. In both cases, the operation then proceeds to step 57.

At step 57, the first Tx controller 19 determines whether j is the last data packet. The determination can be made on the basis of a count received from the switch 15, control signals in the header of the packet, or in any other suitable manner. If the packet is not the last data packet, the operation proceeds to step 58 where j is incremented. The operation then returns to step 51 to proceed with transfer of further data packets. If the packet is the last data packet, the transfer of the data signal is complete, and the operation ends at step 59.

To allow the maximum possible bandwidth to be used, the depth of the first FIFO 17 (i.e. the number of memory locations in and thus bits comprising the FIFO 17) should be large enough to allow continuous writing of data to the storage locations during the time taken to transmit and receive the control signal containing FIFO pointer for one storage location. For example, if the round trip time of the control signal is $6\tau_N$, where $\tau_N$ is the period of clock N, then a maximum of six data packets may have been written to sequential storage locations of the first FIFO 17 before the first Tx controller 19 determines that data packet in one of the storage locations has been read and thus that the storage location is available for writing data to. Thus, the provision of a FIFO 17, and corresponding connector 17A, having a size of six storage locations is sufficient to achieve maximum bandwidth utilisation.

The second transmission module 20 is operable to transfer data to the first receiver module 14 in a similar way to the above-described method. The data may comprise a response to the data received from the first domain, or it may comprise an unrelated request. As the transfer of data from the first Tx module 13 to the second Rx module 21 is independent of the transfer of data from the second Tx module 20 to the first Rx module 14, the operation latency of the components on the first and second domains 2, 3 does not delay the transmission of data.

For example, the first CPU 9 on the second domain 3 may transmit a memory read request to the first memory 6 on the first domain 2. While the first memory 7 is generating the response to the memory read request, the first CPU 9 may transfer a second request, for example to the peripheral module 5 on the first domain. That is, the delay to transfer data from the second clock boundary to the first clock boundary 10 (and vice versa) depends only on the delay to transmit the FIFO pointer to the second clock boundary and from there back to the first clock boundary. This delay depends on the frequency relationship between the clock N and the clock M. Thus, if the frequency relationship of the clock N and the clock M is known, the depth of the first FIFO 17 and the second FIFO 24 can be fixed.

This assumes that the first domain 2 (for example) is capable of providing multiple outstanding operations. Thus, new operations can be performed while waiting for a response from outstanding operations. This provides the most efficient usage of the system. Numerous currently available CPUs and DMAs are capable of doing this.

The first and second clock boundaries can provide transfer of data over the domain boundary where the domains are asynchronous.

Domains can be reset independently of one another. When a domain is reset, the value of the read and write pointers returns to the default value, which in this example is zero. The may provide misleading information to the other domains when data transfer occurs. According to advantageous aspects of the invention, the read and write pointers are reset to zero once transfer of data is complete and the idle state is entered into, by transmitting "dummy packets" to move the read and write pointers back to zero.

Figure 5:
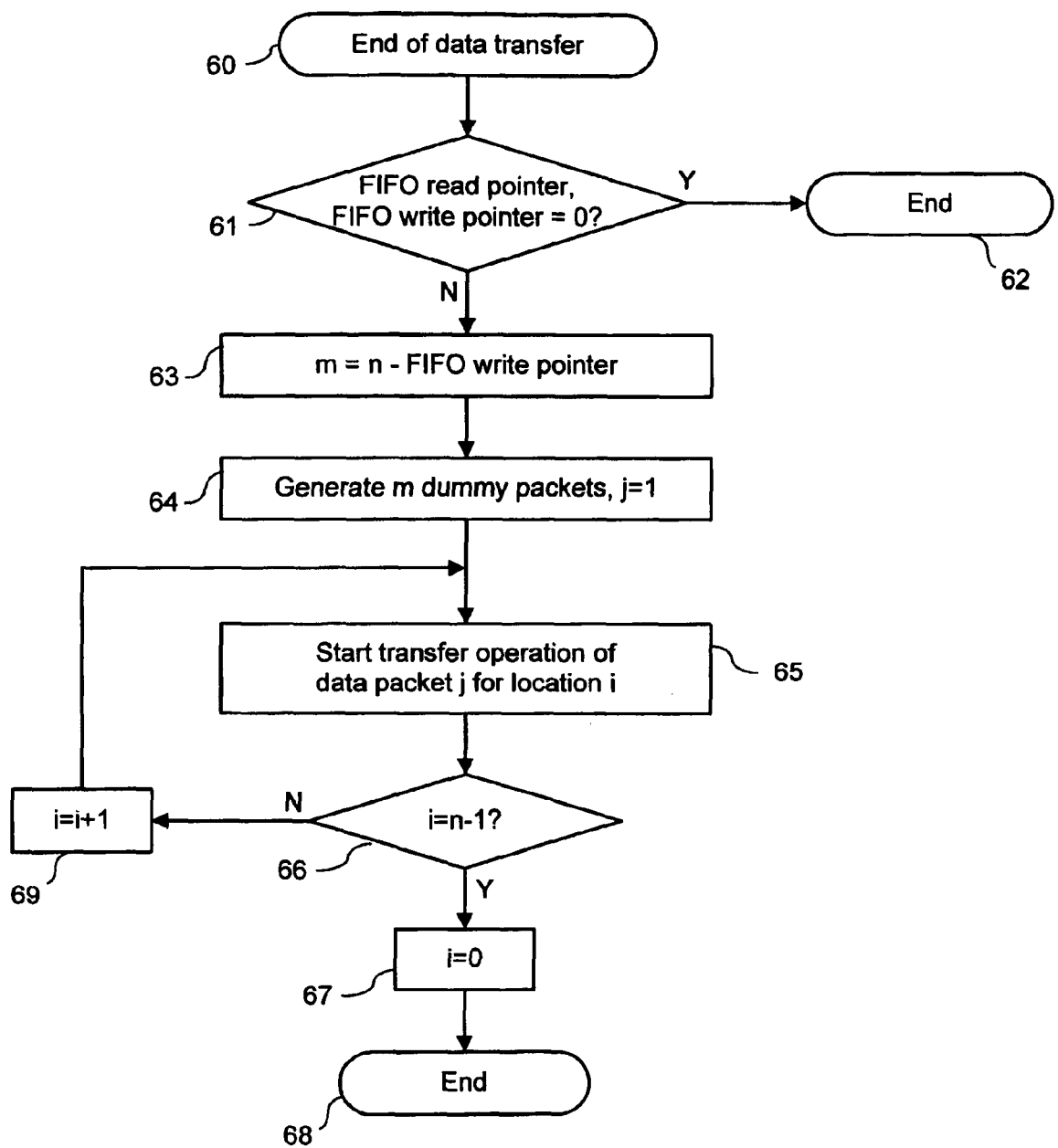
FIG. 5 is a flow diagram of a method of resetting in idle state according to the present invention.

Referring to FIG. 5, an operation to reset in idle state begins at step 60 when data transfer is complete. At step 61, it is determined whether the FIFO write pointer and the FIFO read pointer (which is always equal to the FIFO write pointer at the end of data transfer) are equal to zero. If the FIFO read pointer and FIFO write pointer are already equal to zero, resetting of their values is not required and the operation ends at step 62.

If, instead, it is determined at step 61 that the FIFO write pointer and FIFO read pointer are not equal to 0, the operation proceeds to step 63. At step 63, a variable m is set to n minus the FIFO write pointer. That is, m is set to the number of dummy packets that if transferred would increment the FIFO read and write pointers to 0. At step 64, the first Tx controller 19 generates m dummy packets. The dummy packets may be packets that comprise only null values for data, and a header containing control information indicating that they are dummy packets and indicating whether the packet is the last packet. The packet counter j is set to 1.

At step 65 transfer of a dummy packet is carried out for location i. Here, j is 1 as it is the first dummy packet, and i is equal to the FIFO write pointer +1 as it was set to this value at step 56 of the FIG. 4 operation. Transfer of the dummy packets is carried out in accordance with the operation described with reference to FIGS. 3A 3B, except at step 32 data is not received from the switch. Instead, the operation starts at step 33 when the generated dummy packet is written to the first FIFO 17. When the packets are received at the second Rx controller 21, they are identified as dummy packets by the second Rx controller 25. This may be by means of information in the packet header. The dummy packet is not passed to the second switch 22, and is only used to increment the FIFO read pointer.

At step 66, it is determined whether i is equal to n–1 i.e. whether the last storage location of the first FIFO 17 has been reached. If i is equal to n–1, the operation proceeds to step 68 where i is set to 0. The operation then ends at step 68.

If instead at step 66 it is determined that i does not equal n–1, the operation proceeds to step 69 where i and j are incremented. The operation then returns to step 65 to transfer a further dummy packet.

The above-described operation acts to drive the FIFO read and write pointers to 0. Thus, if after data transfer one of the domains is reset, the FIFO read and write pointers will still correspond to one another. Thus, the first domain 2 and the second domain 3 can be fully asynchronous.

As the clock M and the clock N can be independently generated, the clock M maybe faster than the clock N, the clock M may be slower than the clock N, or the clock N and the clock M may have the same speed.

Again taking data transfer from the first domain 2 to the second domain 3 as an example, if the clock N in the first domain 2 is faster than the clock M in the second domain 3, the destination (i.e. the second domain 3) is limiting the clock bridge performance. Thus, the second domain 3 is able to fill the first FIFO 17 on the first clock boundary faster than destination is able to read from it. In this case, the second clock boundary operates at its maximum frequency and all bursts are continuous i.e. there are no empty spaces are between commands.

If the clock N in the first domain 2 is the same speed as the clock M in the second domain 3 (but may not be the same phase), the case is similar to the case above. That is, the second clock boundary operates at its maximum frequency and all burst are continuous. However, the time delay between sending the first control signal and receiving the second control signal is greater than the time delay when the clock N and the clock M have a different frequency from one another. Thus, for optimal bandwidth utilisation, this condition should be used for defining the size of the first FIFO 17 and the second FIFO 24 if the frequencies of clock N and clock M can be dynamically scaled. The clocks may be at the same frequency in a distributed clock system.

If the clock N in the first domain 2 is slower than the clock M in the second domain 3, some difficulties may arise if the operation described with reference to FIGS. 3A, 3B and 4 are followed. This is because the second clock boundary could experience burst information with holes between operations, as the first domain would not able to fill the first FIFO 17 with data as quickly as the second clock boundary is able to read the data.

In this case, a second operation to transfer the data can be used. The second operation can provide that the second clock boundary does not immediately start attempting to read a data signal if there will be more data signals coming from the first clock boundary. This can be achieved by the use of two parameters: "timeout" and "threshold". "Timeout" defines a longest time according to the clock N that data can be held in the first FIFO 17 before executing it to the second clock boundary. "Threshold" defines how many data packets should be stored in the first FIFO 17 before the second Rx controller 25 starts control of data transfer to the second clock boundary. With these parameters, it is possible to collect burst information in the first clock boundary even though the source clock (clock N) is slower than destination clock (clock M). This does not decrease bandwidth, since the clock N is limiting the bandwidth.

Figure 6A:
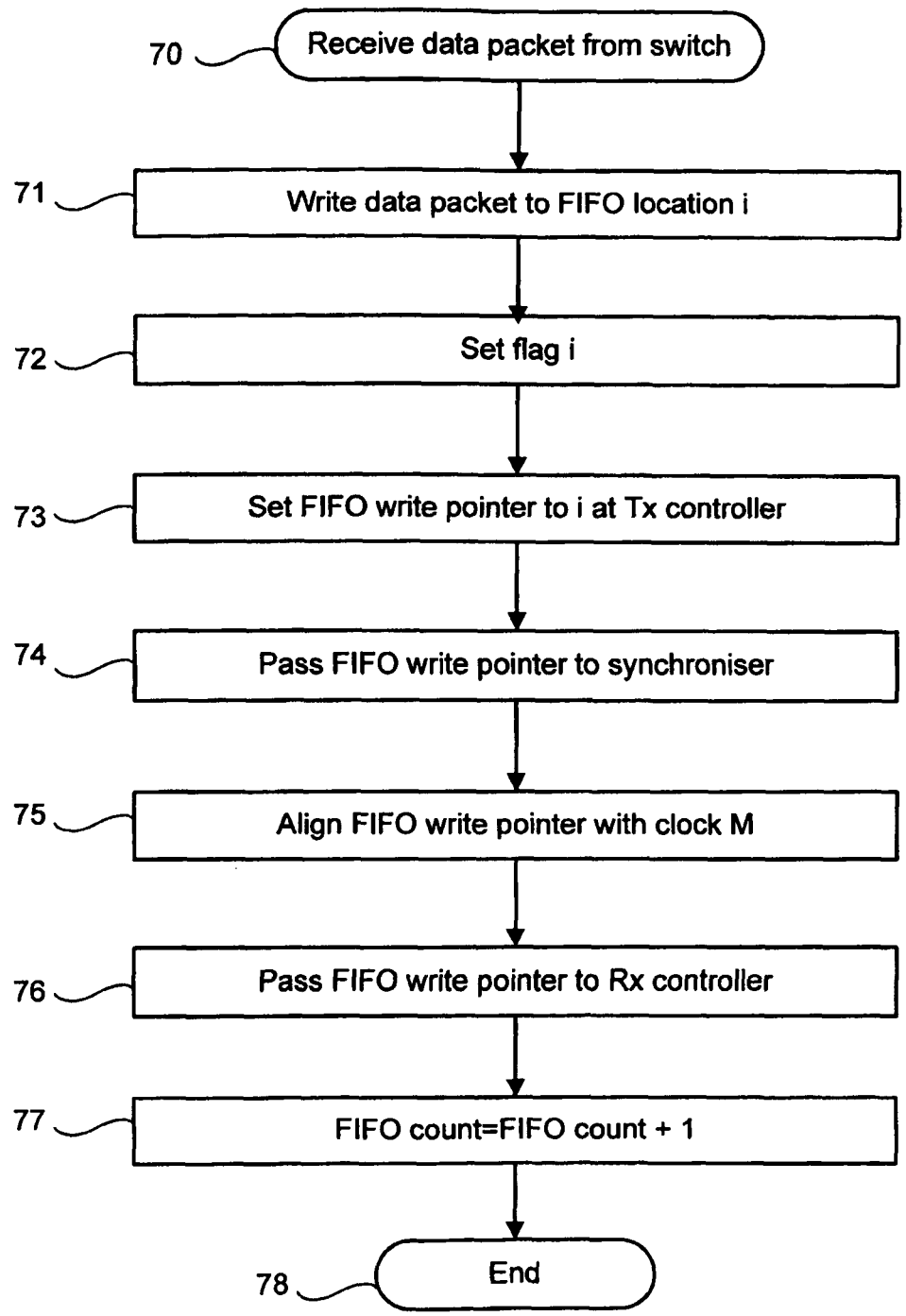
FIGS. 6A and 6B are flow diagrams of a second method of transferring a data packet according to the present invention.

Referring to FIG. 6A, an operation for writing a single data packet to the first clock boundary begins at step 70 when the data packet is received from the first switch 15.

At step 71, the packet of data is written to location i of the FIFO 17 of the first clock boundary, synchronously with the clock N running on the first domain 2, under control of the Tx controller 19. At step 72, the Tx controller 19 sets the flag i.

At step 73, the first Tx controller 19 sets the FIFO write pointer to i to indicate that data has been written to the corresponding storage location. At step 74, the first Tx controller 19 sends the FIFO write pointer as a control signal over the domain boundary 31 to the first synchroniser 27 on the second clock boundary. As with the previous operations the write pointer can be encoded with Gray code or a unit distance code, such as thermo code.

At step 75, the first synchroniser 27 aligns the FIFO write pointer with the clock M running on the second domain 3. The operation then proceeds to step 76, at which the first synchroniser 27 transmits the FIFO write pointer to the second Rx controller 25.

At step 77, a parameter "FIFO count" is incremented. "FIFO count" indicates how many data packets that have not yet been read by the second MUX 26 are stored in the first FIFO 17. The "FIFO count" indicator is internal to the second Rx controller 25. The "FIFO count" indicator can be set using the FIFO write pointer generated by the first Tx controller 19 and the FIFO read pointer generated by the second Rx controller 25. That is, "FIFO count" can be equal to the difference between the read and write pointers (where the difference is calculated taking into account the circularly addressable elements).

In alternative embodiments, a "FIFO count" is not used, and the difference between the pointers is calculated by the second Rx controller 25 when it is required to determine how many data packets that have not yet been read by the second MUX 26 are stored in the first FIFO 17.

The operation ends at step 68.

Figure 6B:
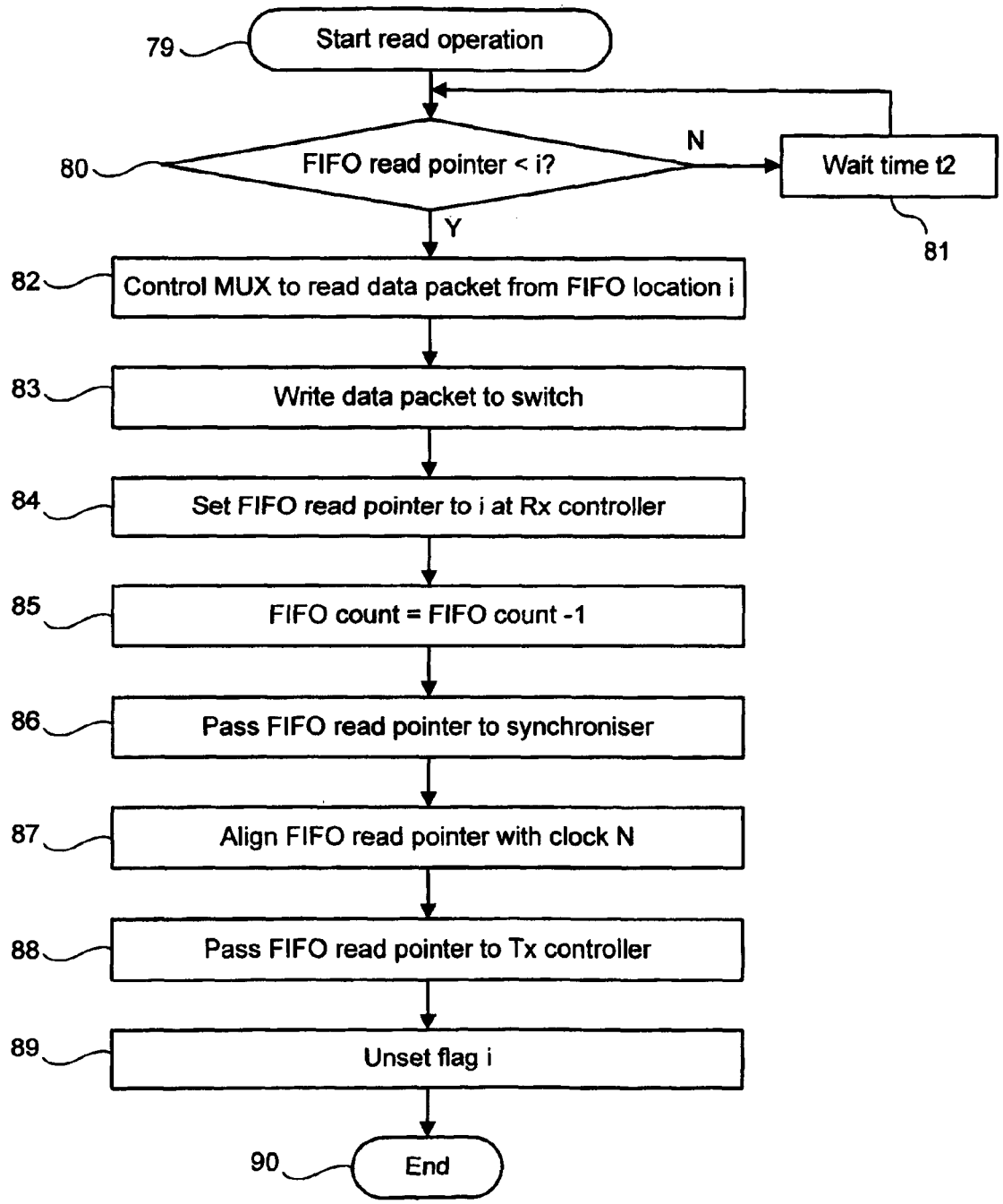

Referring to FIG. 6B, an operation for reading a single data packet from storage location i of the first FIFO 17 begins at step 79. At step 80, the second Rx controller 25 determines whether the FIFO read pointer is less than the received FIFO write pointer i, i.e. whether there is new data in the first FIFO 17 that can be read. If the FIFO write pointer i is equal to the FIFO read pointer, indicating that there is not yet new data in storage location i, the operation proceeds to step 81 where the second Rx controller 25 waits a time delay t2 before performing the determination again.

If the FIFO read pointer is less than the FIFO write pointer i the operation proceeds to step 82. At step 82, the second Rx controller 25 controls the second MUX 26 to read data from location i of the first FIFO 17. The data is read synchronously with clock M running on the second domain 3.

At step 83, the second MUX 26 transmits the data packet to the second switch 22. The second switch 22 then controls transfer of the packets to the desired component on the second domain. At step 84, the FIFO read pointer is updated to value i by the second Rx controller 25 to indicate that the data has been read from storage location i. Again, the FIFO read pointer can be encoded using Gray code or unit distance code, such as thermo code, to provide reliable pointer generation.

At step 85, FIFO count is decremented as the second Rx controller 25 determines on the basis of the FIFO read pointer that there is now one fewer data packet in the first FIFO 17 that has not yet been read At step 86, the FIFO read pointer is passed as a control signal over the domain boundary 31 to the second synchroniser 28. At step 87, the second synchroniser 28 aligns the FIFO read pointer with the clock N running on the first domain 2. At step 88, the second synchroniser 28 passes the control signal containing the FIFO read pointer to the first Tx controller 19.

At step 89, since the Tx controller 19 determines that the data in storage location i of the FIFO 17 has been read, it unsets flag i. Thus, the storage location i can be used for writing a new packet of data. The operation ends at step 90.

Figure 7A:
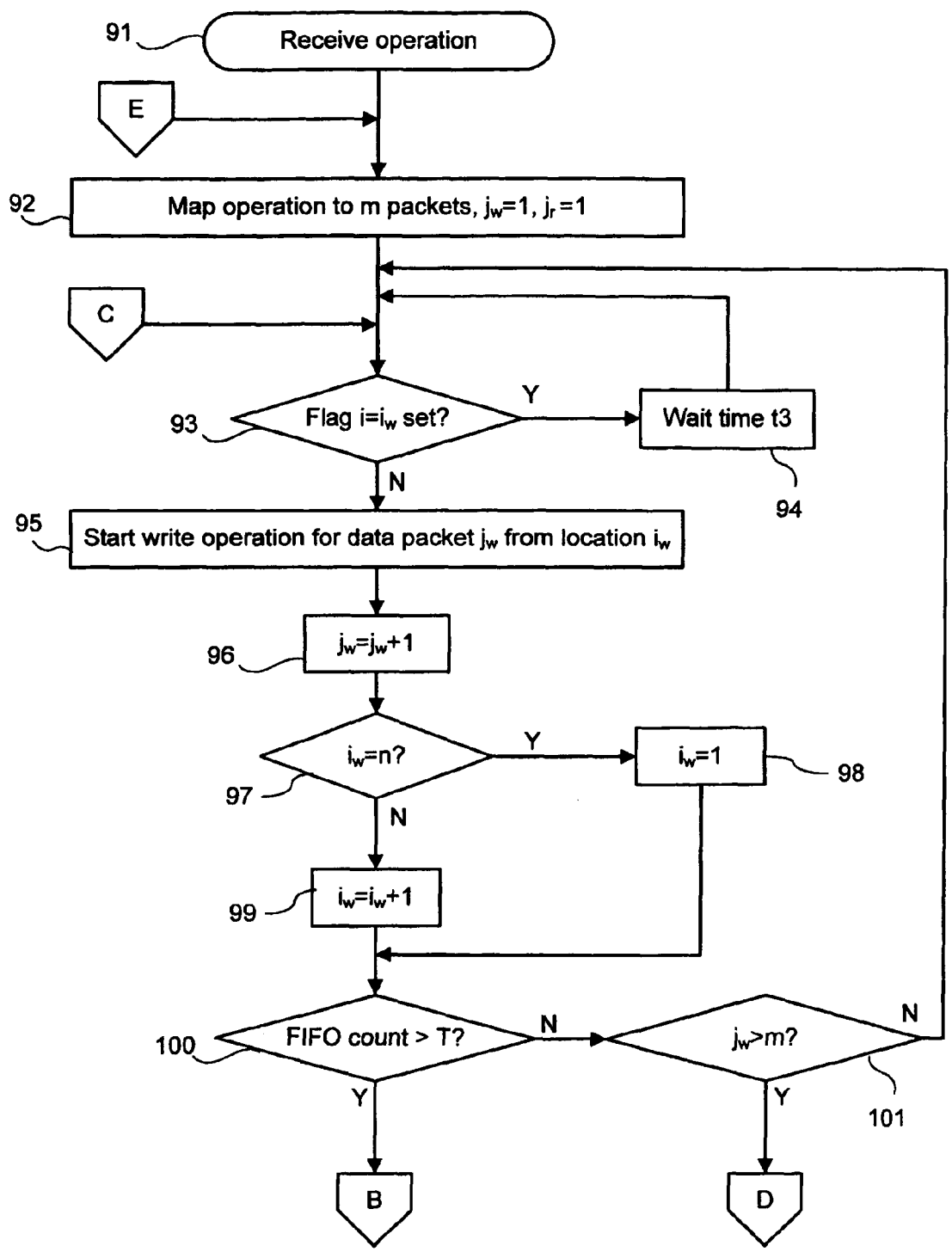
FIGS. 7A, 7B and 7C are flow diagrams of a second method of transferring a data signal according to the present invention.

Referring now to FIG. 7A, an operation for transferring a data signal representing an operation starts at step 91 when the operation is received at the first switch 15.

At step 92, the operation is mapped to discrete packets for transferring over the domain boundary 31. Also at step 92, a read packet counter $j_r$ and a write packet $j_w$ counter are reset.

At step 93, the first Tx controller 19 determines whether the flag $i=i_w$ is set. If this is the first data signal received after start up of the ASIC 1, $i_w$ is given the default value of 0. If the flag is set, indicating that there is data in storage location $i_w$ of the FIFO 17 that has not yet been transferred to the second domain 3, the operation proceeds to step 94. At step 94, the first Tx controller 19 waits a predetermined time delay t3 while data is read from the storage location $i=i_w$ in accordance with the above-described operation. The operation then returns to step 93.

If instead at step 93 the Tx controller determines that the flag $i_w$ is not set, the operation proceeds to step 95. At step 95, the operation described with reference to FIG. 6A is started for data location $i=i_w$, and data packet $j=j_w$, to write a data packet to the first FIFO 17. In this case, $j_w$ is 1 as it is the first data packet of the signal.

While the data packet is being written to the first FIFO 17, the operation proceeds to step 96. At step 96, the packet read pointer $j_w$ is incremented.

At step 97, it is determined whether $i_w$ is equal to n-1, where n is the size of the first FIFO 17. If $i_w$ is equal to n-1, the operation proceeds to step 98 where $i_w$ is set to 0. If $i_w$ is not equal to n-1, the operation proceeds to step 99 where $i_w$ is incremented by 1. In both cases, the operation then proceeds to step 100.

At step 100, the second Rx controller 25 determines whether "FIFO count", which indicates the number of unread data packets in the first FIFO 17, is greater than the threshold value T. If "FIFO count" is greater than the threshold value, the operation proceeds to step 109 (FIG. 7C) for reading of data from the first FIFO 17.

If "FIFO count" is not greater than the threshold value, the operation proceeds to step 101 where it is determined whether the packet is the last data packet. If the packet is not the last data packet, the operation returns to step 93 for writing of more data packets. If instead it is determined that the data packet is the last data packet, the operation proceeds to step 102.

Figure 7B:
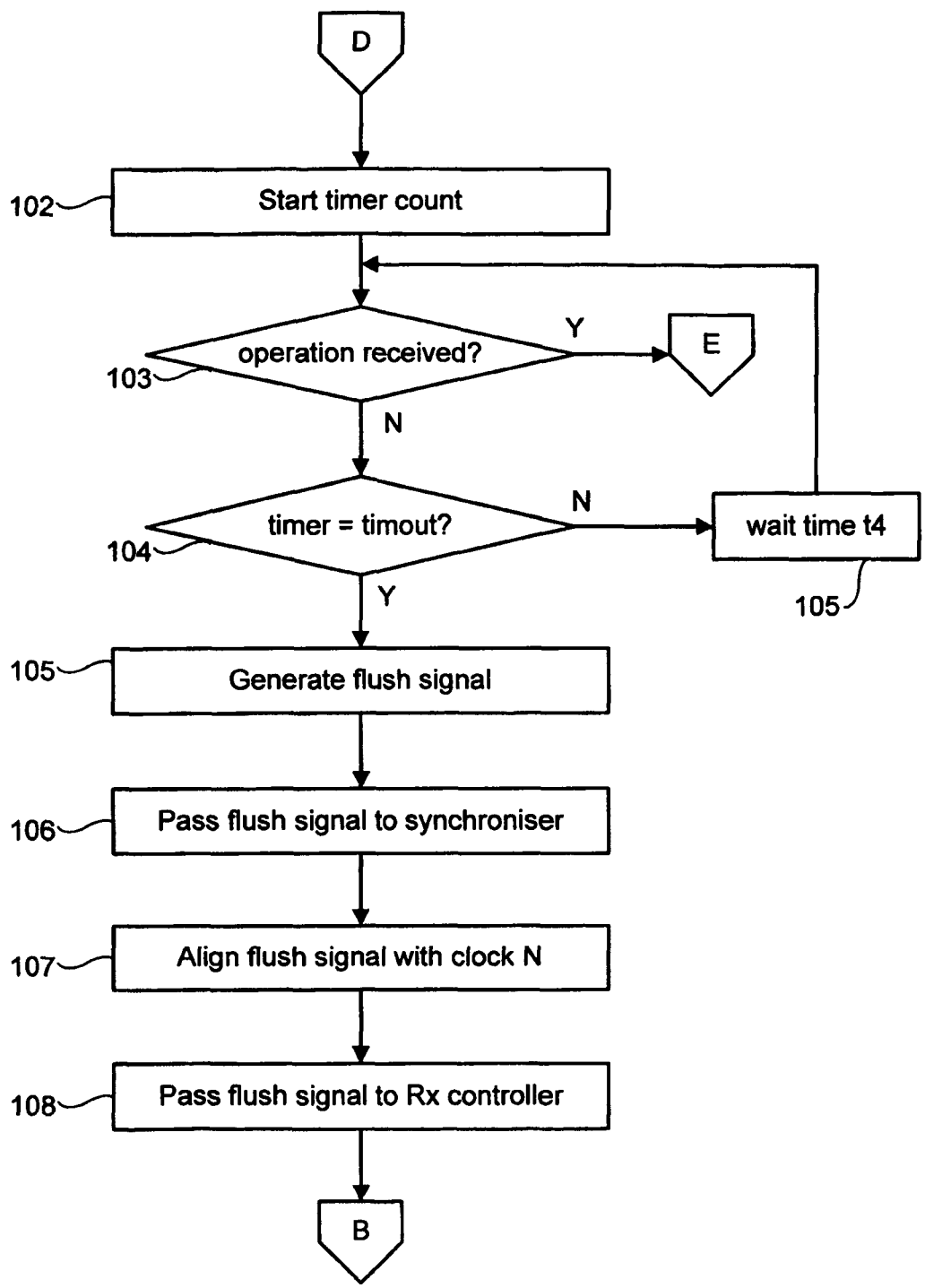

Referring now to FIG. 7B, at step 102 a timer count is started. In this example, the timer count is determined using a timer on the first transmitter module 13. At step 103, it is determined whether a new operation is received. If a new operation is not received, the operation proceeds to step 104. At step 104, it is determined whether the timer count is equal to timeout. If the timer count is equal to timeout, the operation waits a predetermined duration t4, and then returns to step 103.

If an operation is received with timeout, the operation returns to step 92 (FIG. 7A) for transfer of the operation. If no new operation is received with the time "timeout", the data packet can no longer be held in the clock bridge and the operation proceeds to step 105.

At step 105, a flush signal is generated by the first Tx controller 19. The flush signal is a control signal containing instructions to read all the remaining unread data packets in the first FIFO 17. At step 106, the flush signal is passed to the first synchroniser 27. At step 107, the first synchroniser 27 aligns the flush signal with the clock M on the second domain 3. At step 108, the flush signal is then passed to the second Rx controller 25. The operation then proceeds to step 109 for reading of data from the first FIFO 17.

Figure 7C:
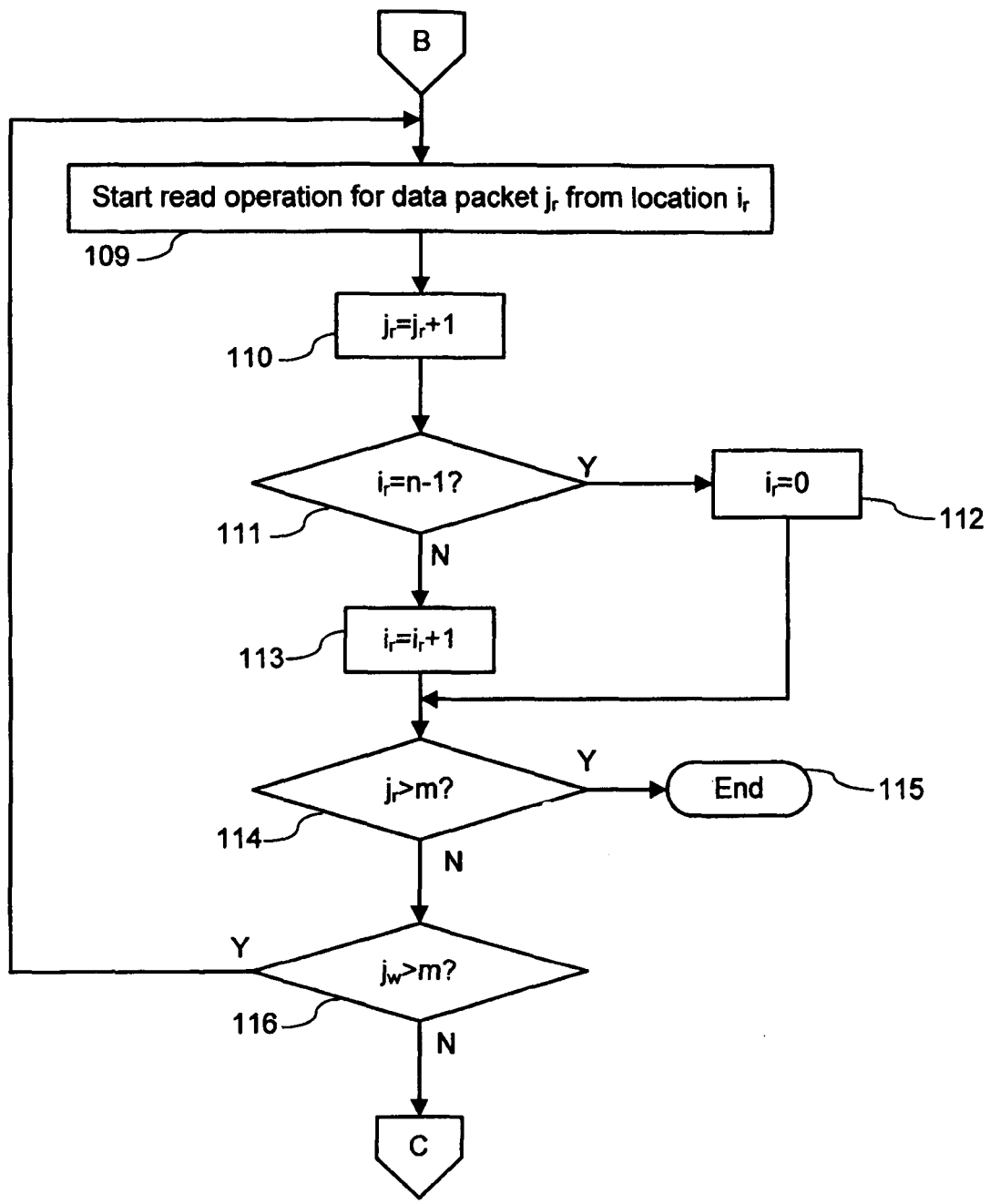

Referring now to FIG. 7C, at step 109 the second Rx controller 25 controls data transfer of packet $j=j_r$ from the location $i=i_r$. At step 110, the packet read pointer $j_r$ is incremented.

At step 111, it is determined whether $i_r$ is equal to n-1. If $i_r$ is equal to n-1, the operation proceeds to step 112 where $i_r$ is set to 0. If $i_r$ is not equal to n-1, the operation proceeds to step 113 where $i_r$ is incremented by 1. In both cases, the operation then proceeds to step 114.

At step 114, the Tx controller 19 determines whether $j=j_r$ is the last data packet. The determination can be made on the basis of a count received from the switch 15, or in any other suitable manner. If the packet is the last data packet, it indicates that all the data packets have been written to the first FIFO 17 and read from the first FIFO 17, and thus the operation ends at step 98.

If the packet is not the last data packet, the operation proceeds to step 115 where it is determined whether the last data packet has yet been written to the first FIFO 17. If the last data packet has already been written (which will always be the case if the operation has proceeded via step 108 at which a flush signal is received at the second Rx controller 25), the operation returns to step 109 to start the read operation for the next data packet. If the last data packet has not yet been written, the operation instead returns to step 93 (FIG. 7A) to continue writing of data packets to the first FIFO 17.

The above-described operation allows data to be sent even when the clock on the transmitter side is slower than the clock on the receiver side, without gaps in the operation being received at the receiver side.

The above-described apparatus allows information to be transmitted efficiently even when the information in not burst information, and good bandwidth can be realised with all kinds of operations.

Figure 8:
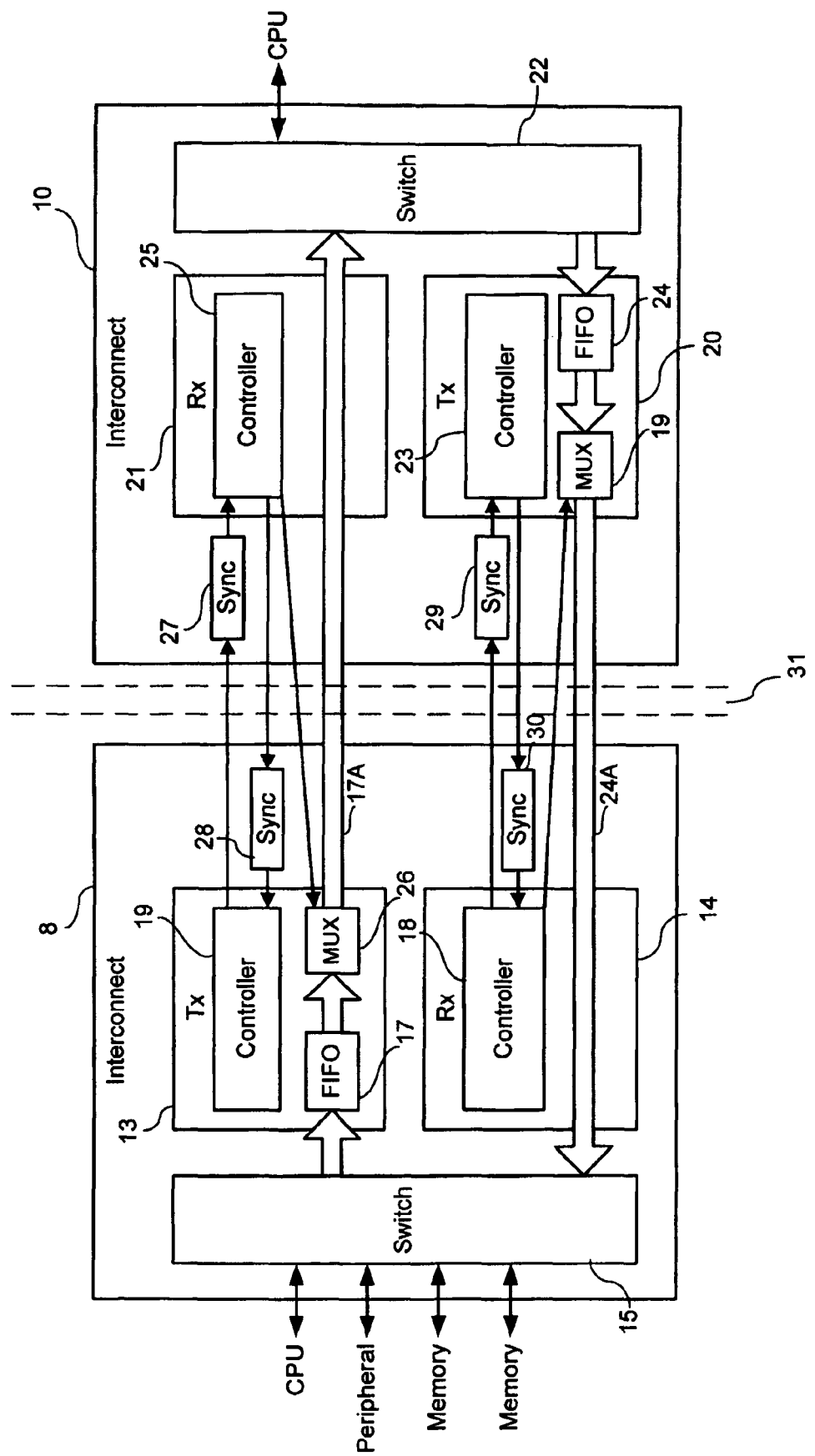
FIG. 8 is a schematic diagram of a second embodiment of two clock boundaries according to the present invention.

Referring now to FIG. 8, a second embodiment of an ASIC (not shown) includes a first interconnect 8 and a second clock boundary 10. The first and second interconnects 8, 10 can form part of the FIG. 1 ASIC 1.

The structure of the first interconnect 8 and the second interconnect 10 is substantially the same as the FIG. 2 ASIC. However, in the second embodiment, the second MUX 19 is provided on the Tx module 13 of the first clock boundary and the first MUX 19 is provided on the Tx module 20 of the second clock boundary.

The first Rx controller 18 is operable to control the first MUX 19 by means of a control signal transmitted over the domain boundary 31. The second Rx controller 25 is operable to control the second MUX 26 also by means of a control signal transmitted over the domain boundary 31.

Operation of the second embodiment is the same as that described above with reference to FIGS. 3A, 3B, 4, 5, 6A, 6B, 7A, 7B and 7C.

In the second embodied ASIC, the width of the connection 17A is the size of the MUX (i.e. one packet) rather than the size of the first FIFO 17 (i.e. six packets).

Thus, there are substantially fewer signal lines crossing over the domain boundary 31. However, the first embodied ASIC can achieve better timing control, as the control signals for the MUX are not routed across the domain boundary 31.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

For example, two or all of the first domain 2, the second domain 3 and the third domain 4 may be clocked by a single clock. The clock bridge may be employed if it is not guaranteed that the branch of the clock tree running each of the domains is in phase.

In addition, it may not be necessary to check if the packet is the last data packet in the methods described with reference to FIGS. 4, 7A and 7B. Instead, it can be determined that the packet is the last data packet if no further packet is received before the timer count reaches timeout.

Also, instead of using discreet synchronisers 27-30 some equivalent may be used. The function of the synchronisers 27-30 is to align the control signals with the clock on the destination domain. This function could be provided by elements other than the synchronisers. The synchronisers may be incorporated within the controllers 18, 19, 24, 25 for instance. However, the use of external synchronisers gives rise to certain advantages.

The invention claimed is:

1. A device, the device comprising an integrated circuit having first and second domains,
the first domain having a first clock boundary module; and
the second domain having a second clock boundary module,
wherein the first clock boundary module comprises:
a buffer, for storing data for transfer to the second domain; and
a first controller operable to send a first control signal to the second clock boundary module via a first synchroniser, the first control signal indicating a presence of a packet of data in a first storage location of the buffer,
wherein one of the first and second clock boundary modules comprises a multiplexer having inputs connected to outputs of the buffer and an output connected to circuitry forming part of the second domain; and
wherein the second clock boundary module comprises:
a second controller, operable in response to receiving the first control signal to control said multiplexer to transfer said data from an output of the buffer, and to send a second control signal to the first controller via a second synchroniser, the second control signal indicating transfer of said data,
wherein the buffer has a default storage location, said default storage location being a value of the first control signal when the first domain is reset, and
wherein the first controller is operable, in response to determining that data transfer from said first controller is complete, to reset the first control signal and the second control signal such that the first control signal and the second control signal identify the default storage location of the buffer and to enter an idle state,
wherein resetting the first and second control signals comprises controlling a transfer of dummy packets, said dummy packets containing null information,
wherein the number of said dummy packets is sufficient to drive the first control signal and the second control signal to identify the default storage location of the buffer.

2. The device as claimed in claim 1, wherein the first controller is further operable in response to receiving the second control signal to control transfer of further data to the first storage location of the buffer.

3. The device as claimed in claim 1, wherein the first controller is further operable, after sending said first control signal and before receiving said second control signal, to control transfer of additional packets of data to other storage locations of the buffer.

4. The device as claimed in claim 1, wherein the buffer comprises a First In First Out (FIFO) buffer.

5. The device as claimed in claim 1, wherein the multiplexer forms part of the second clock boundary modules.

6. The device as claimed in claim 1, wherein said first control signal comprises a write pointer, the write pointer indicating a storage location of a packet of data most recently transferred to the buffer.

7. The device as claimed in claim 1, wherein said second control signal comprises a read pointer, the read pointer indicating a storage location of a packet of data most recently transferred from the buffer.

8. The device as claimed in claim 1, wherein the first domain is clocked by a first clock and the second domain is clocked by a second clock and one of the first clock and the second clock is controllable independently from the other of the first clock and the second clock.

9. The device as claimed in claim 1, wherein:
the second domain further comprises:
a second buffer, for storing data for transfer to the first domain; and
a third controller operable to send a third control signal to the first clock boundary module via a third synchroniser, the third control signal indicating a presence of a packet of data in a first storage location of the second buffer;
wherein the device comprises a second multiplexer having inputs connected to outputs of the second buffer and an output connected to circuitry forming part of the first domain; and
the first domain further comprises:
a fourth controller, operable in response to receiving the third control signal to control said second multiplexer to transfer data from an output of the second buffer, and to send a fourth control signal to the first controller via a fourth synchroniser, the fourth control signal indicating said transfer of data from the output of the second buffer.

10. The device as claimed in claim 1, wherein the device is portable.

11. A method comprising:
- storing, by a buffer of a first clock boundary module of a first domain of an integrated circuit, data for transfer to a second domain;
- sending, via a first controller of the first domain, a first control signal to a second clock boundary module of a second domain of the integrated circuit via a first synchroniser, the first control signal indicating a presence of a packet of data in a first storage location of the buffer,
- wherein one of the first and second clock boundary modules comprises a multiplexer having inputs connected to outputs of the buffer and an output connected to circuitry forming part of the second domain;
- in response to receiving the first control signal, controlling, by a second controller of the second clock boundary module, said multiplexer to transfer said data from an output of the buffer, and sending, by the second controller, a second control signal to the first controller via a second synchroniser, the second control signal indicating transfer of said data,
- wherein the buffer has a default storage location, said default storage location being a value of the first control signal when the first domain is reset; and
- in response to determining that data transfer from said first controller is complete, resetting, by the first controller, the first control signal and the second control signal such that the first control signal and the second control signal identify the default storage location of the buffer and entering, by the first controller, an idle state,
- wherein resetting the first and second control signals comprises controlling a transfer of dummy packets, said dummy packets containing null information,
- wherein the number of said dummy packets is sufficient to drive the first control signal and the second control signal to identify the default storage location of the buffer.

12. The method as claimed in claim 11, comprising, in response to receiving the second control signal, controlling, by the first controller, transfer of further data to the first storage location of the buffer.

13. The method as claimed in claim 11, comprising, after sending said first control signal and before receiving said second control signal, controlling, by the first controller, transfer of additional packets of data to other storage locations of the buffer.

14. The method as claimed in claim 11, wherein the buffer comprises a First In First Out (FIFO) buffer.

15. The method as claimed in claim 11, wherein the multiplexer forms part of the second clock boundary module.

16. The method as claimed in claim 11, wherein said first control signal comprises a write pointer, the write pointer indicating a storage location of a packet of data most recently transferred to the buffer.

17. The method as claimed in claim 11, wherein said second control signal comprises a read pointer, the read pointer indicating a storage location of a packet of data most recently transferred from the buffer.

18. The method as claimed in claim 11, comprising:
- storing, by a second buffer of the second domain, data for transfer to the first domain; and
- sending, by a third controller of the second domain, a third control signal to the first clock boundary module via a third synchroniser, the third control signal indicating a presence of a packet of data in a first storage location of the second buffer; and
- in response to receiving the third control signal, controlling, by a fourth controller of the first domain, a second multiplexer to transfer data from an output of the second buffer, and sending, by the fourth controller, fourth control signal to the first controller via a fourth synchroniser, the fourth control signal indicating said transfer of data from the output of the second buffer, said second multiplexer having inputs connected to outputs of the second buffer and an output connected to circuitry forming part of the first domain.

* * * * *